Jan. 10, 1950  J. M. BROWN  2,493,912
DISTANCE MEASURING DEVICE
Filed March 22, 1948
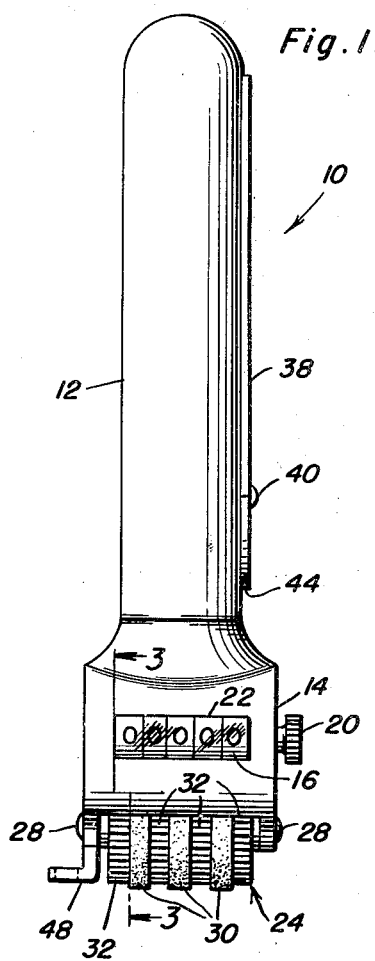
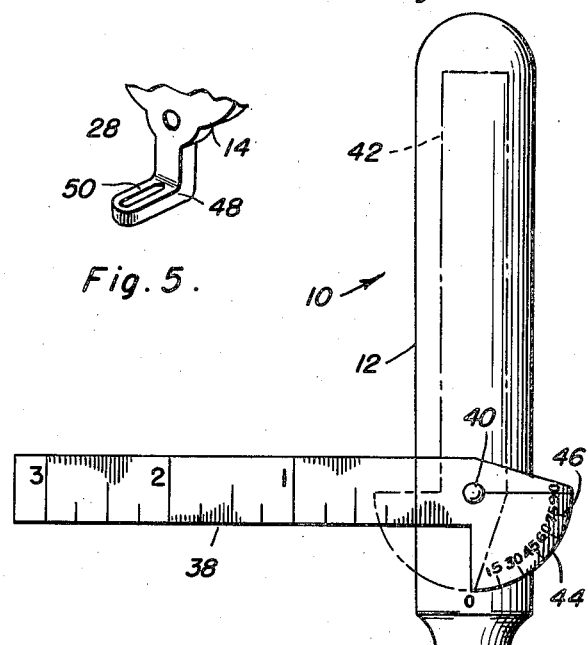
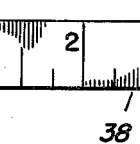
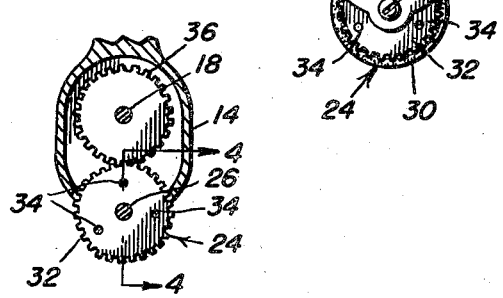
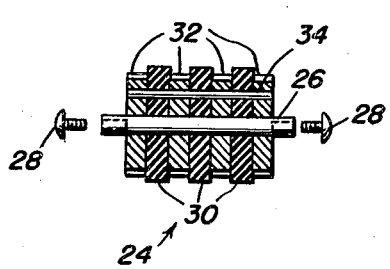
Inventor
Jackson M. Brown
By Clarence A. O'Brien
and Harvey B. Jackson
Attorneys Patented Jan. 10, 1950

2,493,912

UNITED STATES PATENT OFFICE 2,493,912

DISTANCE MEASURING DEVICE

Jackson M. Brown, Starkville, Miss.

Application March 22, 1948, Serial No. 16,212

1 Claim. (Cl. 33—141)

This invention relates to new and useful improvements and structural refinements in distance measuring devices, and the principal object of the invention is to assure convenience, simplicity, and above all, accuracy in effecting the measuring operation.

This object is achieved by the provision of a measuring device wherein a traveler, so to speak, mounted upon a convenient handle, may be rolled along the surface to be measured, rotation of the traveler being imparted to a counting unit, whereby the distance or length may be quickly and easily computed.

An important feature of the invention resides in its adaptability to measuring distances on surfaces of various types of material, regardless of whether they are flat, arcuated, or of a tubular or cylindrical configuration.

Another feature of the invention resides in the provision of a distance measuring device which is simple in construction, which may be easily and conveniently manipulated, and which will readily lend itself to economical manufacture.

With the above more important objects and features in view, and such other objects and features as may become apparent as this specification proceeds, the invention consists essentially of the arrangement and construction of parts as illustrated in the accompanying drawings, in which:

Figure 1 is a front elevational view of the invention.

Figure 2 is a side elevational view thereof.

Figure 3 is a cross sectional view, taken substantially in the plane line 3—3 in Figure 1;

Figure 4 is a cross sectional view, taken substantially in the plane of the line 4—4 in Figure 3; and Figure 5 is a fragmentary perspective view of a stop marker guide used in the invention.

Like characters of reference are employed to designate like parts in the specification and throughout the several views.

Referring now to the accompanying drawings in detail, the invention consists of a distance measuring device designated generally by the reference character 10, the same embodying in its construction a suitable handle 12, provided at one end thereof with an enlarged head 14.

The head 14 is hollow and accommodates a "Veeder" counter unit 16 of conventional type, this counter unit simply assuming the form of a plurality of numbered, juxtaposed disks, rotatably mounted upon a shaft 18, provided in the head 14 and equipped with a knob 20, whereby the entire counter unit may be reset to a "zero" or starting position, when so desired.

Moreover, an elongated lens 22 may be provided on the head 14, in order that the reading of the counter unit 16 may be quickly and easily observed.

The essence of novelty in the invention resides in the provision of what may be referred to as a traveler designated generally by the reference character 24, this being rotatably mounted upon a shaft 26 journaled in the head 14, as will be clearly apparent.

The shaft 26 is secured in the head 14 by means of suitable screws 28, and the traveler 24 includes in its construction a plurality of resilient discs or rollers 30 having a uniform, relatively large diameter, and a plurality of non-resilient discs or rollers 32 having a uniform, relatively small diameter, as will be clearly apparent from the accompanying drawings. It is to be noted that the rollers 32 are interposed in coaxial relation, between the rollers 30, and that both sets of rollers are secured together by means of a plurality of transversely extending pins 34, so that simultaneous rotation of the rollers 30, 32 is effected.

The rollers 32 are provided with notched or toothed peripheric portions, as will be clearly apparent, and one of the rollers operatively engages a correspondingly notched or toothed gear-like wheel 36 secured to the aforementioned shaft 18, whereby the traveler 24 is operatively connected to the counter unit 16.

Accordingly, when the invention is placed in use, the traveler 24 may be simply rolled along the surface which is to be measured, and the counter unit 16 will readily indicate the distance traveled along such surface, as will be clearly understood. However, attention is particularly directed to the essence of novelty in the invention, namely, the provision of the resilient and non-resilient rollers 30, 32 respectively, the former being formed from soft rubber, or the like, and being primarily intended for measuring distances on smooth surfaces such as glass, lumber, or the like. That is to say, sufficient traction or coefficient of friction will exist between the resilient rollers 30 and smooth material, so that rotation will be imparted to the entire traveler 24 as the device is rolled along the surface to be measured.

However, when relatively rough surfaces, such as for example, those of brick or concrete are to be measured, pressure exerted on the handle 12 will cause the resilient disks or rollers 30 to be flattened, so that the non-resilient rollers 32 will be brought in engagement with the work.

Needless to say the toothed or knurled surfaces of the non-resilient rollers will assure proper traction and will eliminate the possibility of slippage of the rollers on the work.

From the foregoing it will be apparent that the rollers 30, 32 may be employed selectively for contacting the surface which is to be measured, depending upon the nature of that surface and its ability to impart positive rotation to the traveler 24, without slipping.

Needless to say the difference in diameter of the rollers 32 with respect to the rollers 30 is relatively small, being exaggerated in the drawings for sake of clarity, so that the reading of the counter unit 16 is not materially effected by a substantial difference in diameter of the rollers.

For added convenience, a rule 38 may be mounted by means of a pivot 40 upon the handle 12, the rule 38 being swingable from a position shown in the accompanying Figure 2 to a folded position, so to speak, indicated by the phantom line 42. The rule 38 is graduated in such manner that relatively short measurements may be taken therewith, and if desired, the rule may be formed integrally with a quadrant 44 inscribed with angular graduations 46, so that the rule 38 may be used in association with the handle 12 in the manner of a square or of a protractor as will be clearly apparent.

If desired, the head 14 may be provided with an L-shaped extension 48, one arm of which is formed with a slot 50 disposed in the plane of the shaft 28. The point of a pencil, or the like (not shown) may be inserted through the slot 50 to mark the work at the end of a measured distance.

It is believed that the objects and advantages of the invention will be clearly understood from the foregoing disclosure and accordingly, further description thereof at this point is deemed unnecessary.

While in the foregoing there has been shown and described the preferred embodiment of this invention it is to be understood that minor changes in the details of construction, combination and arrangement of parts may be resorted to without departing from the spirit and scope of the invention as claimed.

Having described the invention, what is claimed as new is:

In a distance measuring device, the combination of an elongated handle having an enlarged head at one end thereof, a shaft mounted in said head at right angles to the axis of said handle, and a traveller provided on said shaft and comprising at least two coaxial and simultaneously rotatable discs, one of said discs having a relatively small diameter and being formed from relatively hard material, the second disc having a relatively large diameter and being formed from relatively soft and resilient material, the first-mentioned disc having a toothed periphery, and the peripheral portion of the second disc being compressible by pressure on said handle, whereby adjacent peripheral portions of both discs may simultaneously engage the work.

JACKSON M. BROWN.

REFERENCES CITED

The following references are of record in the file of this patent:

UNITED STATES PATENTS

| Number | Name | Date |
|---|---|---|
| 138,829 | Whiting | May 13, 1873 |
| 718,396 | Smith | Jan. 13, 1903 |
| 919,016 | Irino | Apr. 20, 1909 |
| 2,188,201 | Diedrich | Jan. 23, 1940 |
| 2,230,990 | Bennett | Feb. 11, 1941 |
| 2,325,130 | Harmon | July 27, 1943 |